United States Patent
Harstead et al.

(10) Patent No.: US 11,134,506 B2
(45) Date of Patent: Sep. 28, 2021

(54) SYSTEMS AND METHODS FOR AVOIDING DELAYS FOR ULL TRAFFIC

(71) Applicant: Nokia Technologies Oy, Espoo (FI)

(72) Inventors: Edward Harstead, New York, NY (US); Rene Bonk, Pforzheim (DE); Michael Straub, Maulbronn (DE)

(*) Notice: Subject to any disclaimer, the term of this patent is extended or adjusted under 35 U.S.C. 154(b) by 69 days.

(21) Appl. No.: 16/453,981

(22) Filed: Jun. 26, 2019

(65) Prior Publication Data
US 2020/0214022 A1 Jul. 2, 2020

Related U.S. Application Data

(60) Provisional application No. 62/787,746, filed on Jan. 2, 2019.

(51) Int. Cl.
*H04W 72/12* (2009.01)
*H04B 10/27* (2013.01)
*H04B 10/2575* (2013.01)
*H04W 28/02* (2009.01)

(52) U.S. Cl.
CPC .. *H04W 72/1231* (2013.01); *H04B 10/25753* (2013.01); *H04B 10/27* (2013.01); *H04W 28/0236* (2013.01)

(58) Field of Classification Search
CPC .......... H04W 72/1231; H04W 28/0236; H04B 10/25753; H04B 10/27
See application file for complete search history.

(56) References Cited

U.S. PATENT DOCUMENTS

| 7,218,648 B1* | 5/2007 | Jackson | H04L 41/08 370/445 |
| 2008/0138072 A1* | 6/2008 | Sakamoto | H04J 14/025 398/68 |
| 2011/0164661 A1* | 7/2011 | Frenger | H04B 7/15542 375/211 |

OTHER PUBLICATIONS

Pfeiffer, Thomas, et al., "RAN Applications", FSAN Meeting, Dallas, Apr. 2018.
Discussion on RAN Applications, "Opening Method of Quiet Window by Co DBA", NTT Access Network Service Systems Laboratories, NTT Corporation, FSAN Meeting, Jan. 2019.
Harstead, Edward, et al., "Optical Access Networks", Optical Fiber Telecommunications, Chapter 10, vol. IV-B, 2002, pp. 438-512.
Bonk, Rene, et al., "Demonstration of ONU Activation for In-Service TDM-PON Allowing Uninterrupted Low-Latency Transport Links", 2019 Optical Fiber Communications Conference and Exhibition (OFC), pp. 1-3.
Hisano, Daisuke, et al., "Effective Utilization of Unallocated Intervals in TDD-Based Fronthaul Employing TDM-PON", Optical Society of America, vol. 9, No. 9/Sep. 2017/Journal Optical Society of America, pp. D1-D9.

* cited by examiner

*Primary Examiner* — Steven H Nguyen
(74) *Attorney, Agent, or Firm* — Capitol Patent & Trademark Law Firm, PLLC

(57) ABSTRACT

Delays in the transmission of ULL traffic are avoided or substantially reduced by the initiation of opportunistic and probability-based in-band, traffic-free time period windows that do not correspond to time periods of ULL traffic transmissions.

21 Claims, 1 Drawing Sheet

SYSTEMS AND METHODS FOR AVOIDING DELAYS FOR ULL TRAFFIC

RELATED APPLICATION

This application is related to, and claims the benefit of priority from, U.S. Provisional Application No. 62/787,746 filed Jan. 2, 2019 (the "'746 Application"). This application incorporates by reference the entirety of the disclosure of the '746 Application as if such disclosure were set forth in full herein.

INTRODUCTION

This section introduces aspects that may be helpful to facilitate a better understanding of the described invention (s). Accordingly, the statements in this section are to be read in this light and are not to be understood as admissions about what is, or what is not, in the prior art.

A time-division multiplexed (TDM), passive optical network (PON) uses time-division, multiple access (TDMA) to multiplex upstream telecommunications transmissions from a plurality of optical network units (ONUs) to an optical line terminal (OLT).

In order to avoid interference or "collisions" between these upstream transmissions, existing OLTs typically allocate non-overlapping upstream timeslots of varying length to each of the ONUs, and then transmit "grants" to the ONUs, where each grant includes information (e.g., electronic bits) that instructs each ONU as to the point in time it may begin a transmission and when it must end the transmission (e.g., a starting point for its respective time slot and the length of such a timeslot).

In order to prevent collisions between upstream transmissions from different ONUs, the distance (or signal propagation delay) between the OLT and each ONU should be known by the OLT because the OLT has to adjust each ONU's grant to account for the time it takes a particular grant to travel to, and be acknowledged from, a particular ONU (i.e., roundtrip delay). This distance may be measured by a process called "ranging". In advance of the ranging process a serial number acquisition process may be completed (if an OLT is not preconfigured) that requires the use of a "quiet window". It should be understood that while the following description of the inventive systems and methods focuses on the ranging window process within a PON, similar features can be applied to the serial number acquisition process where a "joining" ONU makes itself known to an OLT and to other non-PON infrastructures. Accordingly, it should be understood that where we refer to a "traffic window", such a window may be a ranging window, quiet window or another analogous window. Further, the phrase "traffic window" may be abbreviated 'window" herein.

Referring to FIG. 1 there is illustrated an "in-band" ranging process used in a PON application. As depicted, an OLT 2a may send a ranging "grant" (i.e., signal) to an ONU 3n (where "n" indicates the next ONU to join PON 1) at time "t1" over a connecting medium, such as an optical fiber 4, that wishes to join PON 1 where it should be understood that other ONUs (e.g., ONU 3a, 3b, etc.), are already a part of PON 1 (see FIG. 2). Thereafter, after a specified time delay, Δt, the ONU 3n may return an acknowledgement (i.e., signal) which is received at the OLT 2 at time "t2". The OLT 2a may then calculate the distance (delay) to the ONU 3n from this information, knowing the signal propagation speed in the optical fiber 4 connecting the OLT 2a and ONU 3n and Δt. In alternative embodiment, the OLT may receive this information from another associated device the OLT is in communication with.

However, because the OLT 2a may not have the distance (or roundtrip delay) associated with the joining ONU 3n stored in its memory (or otherwise available to it), in order to reliably receive the ranging acknowledgement from ONU 3n, before other already active ONUs, ONU 3a to ONU 3n-1 begin transmissions to the OLT 2a (i.e., to avoid a "collision" of signals), the OLT 2a must create a ranging window, $w_r$, during which time upstream transmissions from all other ONUs 3a to 3(n-1) within PON 1 are not permitted (see FIG. 2). The length of time of this ranging window, $w_r$, is approximately equal to the following: twice the maximum possible distance between an ONU and OLT 2a within PON 1 minus the minimum possible distance between an ONU and OLT 2a within PON 1 divided by the speed of light in the optical fiber+variation in the response times of Δt. Accordingly, during the length of the ranging window, $w_r$, upstream traffic (e.g., signalling, content) that would normally be sent to the OLT 2a from ONUs 3a to 3(n-1) within PON 1 is typically stored in electronic buffers at the ONUs 3a to 3(n-1).

While the use of ranging windows, $w_r$, may help avoid collisions, the way in which ranging windows are presently generated leads to some distinct disadvantages. For example, upstream traffic from ONUs 3a to 3(n-1) (i.e., from ONUs that are already a part of the PON 1) that would otherwise have been transmitted to the OLT 2a during the ranging window, $w_r$, must now wait in buffers (e.g., electronic memory) at the ONUs 3a to 3(n-1) to be transmitted to the OLT 2a until the ranging window, $w_r$, elapses. This causes unwanted delays (latencies) to the reception of the traffic at the OLT 2a. This is especially detrimental to a network provider that is offering (or has promised to deliver) ultra-low latency (ULL) services (i.e., services with very little delay, e.g. 5G mobile fronthaul services) or that is offering or is promising to offer the transport of data from 5G wireless network/users over a PON (e.g., using distributed processing as defined in the Common Public Radio Interface (e.g., eCPRI) or standardization or similar technology groups). In fact, in some cases the "ranging-induced" latencies that result from existing in-band techniques of generating ranging windows makes such existing techniques incompatible with the provisioning of ULL services or transporting radio/wireless data over a PON.

Still further, because an OLT may not be able to presently predict when a new, joining ONU will be connected to a PON, existing techniques dictate that an OLT create ranging windows, $w_r$, frequently.

As a result, a PON that is configured to provide ULL services or is intended to be used for transporting 5G wireless data will have its traffic regularly delayed and disrupted.

Accordingly, it is desirable to provide systems, devices and related methods that avoid and reduce delays in PON and other networks, in particular, but without limitation, those networks that provide ULL services or that transport 5G wireless data over a PON using, for example, function split interfaces (e.g., a so-called F1 or Fx interface) between a central unit (CU), a distributed unit (DU) and a remote unit (RU), i.e. front-haul, mid-haul or back-haul solutions.

SUMMARY

The inventors disclose various systems, devices and related methods that may be used to avoid and/or reduce delays in a PON and other networks. The inventors describe exemplary embodiments where delays in the transmission of ULL traffic or in transporting 5G wireless data over a PON from ONUs may be avoided or substantially reduced by the opportunistic initiation of "ranging windows" by inventive OLTs, for example. Further, the exemplary devices and related methods described herein may also be applied to the generation of other "traffic-free" time periods, such as the generation of a schedule of so-called "quiet windows", for example, described elsewhere herein.

For example, one embodiment may comprise a system for identifying traffic-free, in-band time period windows ("traffic windows" or just "windows") comprising: an exemplary device (e.g., an OLT) operable to identify one or more patterns of re-occurring and unused or unallocated frames or subframes; and select one or more frames or subframes within an identified pattern based on stored values for each frame and subframe, the values indicative of the probability that the selected frames or subframes may be re-occurring and unused or unallocated, for use as a part of one of the traffic windows based on the stored probability values.

The exemplary device may be further operable to analyse stored bandwidth maps or frame or subframe allocations and identify one or more patterns of re-occurring and unused or unallocated frames or subframes based on the analysis of the maps or allocations, and/or generate a schedule of traffic windows, wherein each window is scheduled to correspond to a time period that does not substantially, adversely affect ULL traffic transmissions. Such a schedule may comprise start times for initiation of one or more of in-band traffic-free time period windows, for example.

In one embodiment, the device may comprise an inventive OLT.

Further, the device may be further operable to receive frame and subframe allocations from a base station, central unit (CU) or distributed unit (DU), where the base station, CU or DU may operate in accordance with a Cooperative DBA or CTI protocol. Relatedly, the device may be operable to send an indication to the base station, CU or DU to inform the base station, CU or DU that the device will control scheduling of traffic windows.

The exemplary system may further comprise a base station CU or DU that are operable to receive an indication that an exemplary device will control scheduling of traffic windows.

In yet another exemplary system, an exemplary device may compete one or more of the above described features and, in addition, may be further operable to set a threshold time limit value, and determine whether or not a time period since the initiation of a last in-band, traffic-free time period window exceeds the threshold value. If the threshold time limit value has been exceeded, the device may be further operable to interrupt ULL traffic transmissions and initiate an in-band, traffic-free time period window.

In addition to the above-described system, the inventors provide for related methods. For example, on exemplary method identifying traffic-free, in-band time period windows may comprise: identifying one or more patterns of re-occurring and unused or unallocated frames or subframes; and selecting one or more frames or subframes within an identified pattern based on stored values for each frame and subframe, the values indicative of the probability that the selected frames or subframes may be re-occurring and unused or unallocated, for use as a part of one of the traffic windows based on the stored probability values.

Such an exemplary method may further comprise analysing stored bandwidth maps or frame or subframe allocations and identifying the one or more patterns of re-occurring and unused or unallocated frames or subframes based on the analysis of the maps or allocations, and/or generating a schedule of traffic windows, wherein each window is scheduled to correspond to a time period that does not substantially, adversely affect ultra-low latency traffic transmissions and the schedule may comprise start times for initiation of one or more traffic windows.

Further, the exemplary method may further comprise receiving the frame and subframe allocations from a base station, CU or DU, where the CU or DU may operate in accordance with a Cooperative DBA or CTI protocol.

The method may still further comprise sending an indication to the base station, CU or DU to inform the base station, CU or DU that the base station, CU or DU does not have to control scheduling of traffic windows and, relatedly, further, receiving—at such a base station CU or DU—an indication that the base station, CU or DU does not have to control scheduling of traffic windows.

An alternative method may comprise the features described above and, in addition, may comprise setting a threshold time limit value, determining whether or not a time period since the initiation of a last traffic window exceeds the threshold value, and if, indeed, the threshold time limit value has been exceeded, then interrupting ULL traffic transmissions and initiating a traffic window.

In addition to the inventive systems and methods just described the inventors also provide for additional inventive devices, such as an inventive ONU that may be operable to transmit ULL traffic during an in-band time period traffic window that may be scheduled to correspond to a time period that does not substantially, adversely affect the transmission of the ULL traffic. The traffic window may comprise one or more frames or subframes associated with stored values for each frame and subframe, where the values indicate the probability that the frames or subframes may be re-occurring and unused or unallocated.

DETAILED DESCRIPTION, INCLUDING EXAMPLES

Figure 1:
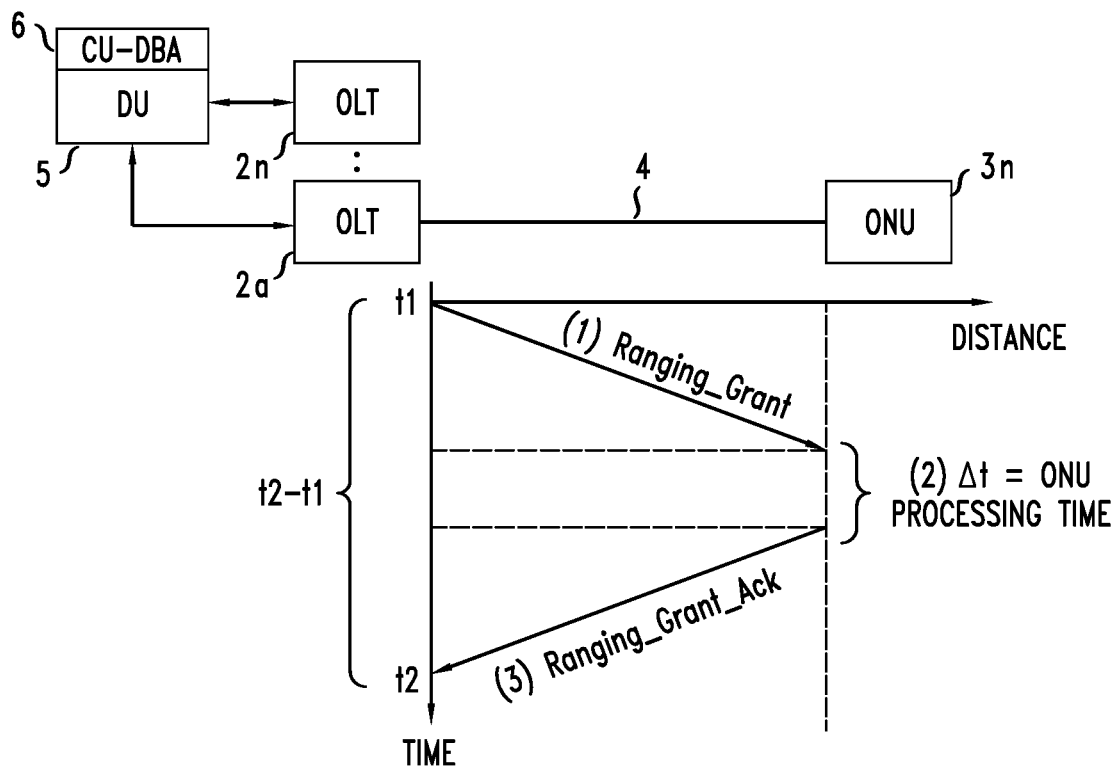
FIG. 1 illustrates the use of a ranging grant and acknowledgment in a simplified PON network.
Figure 2:
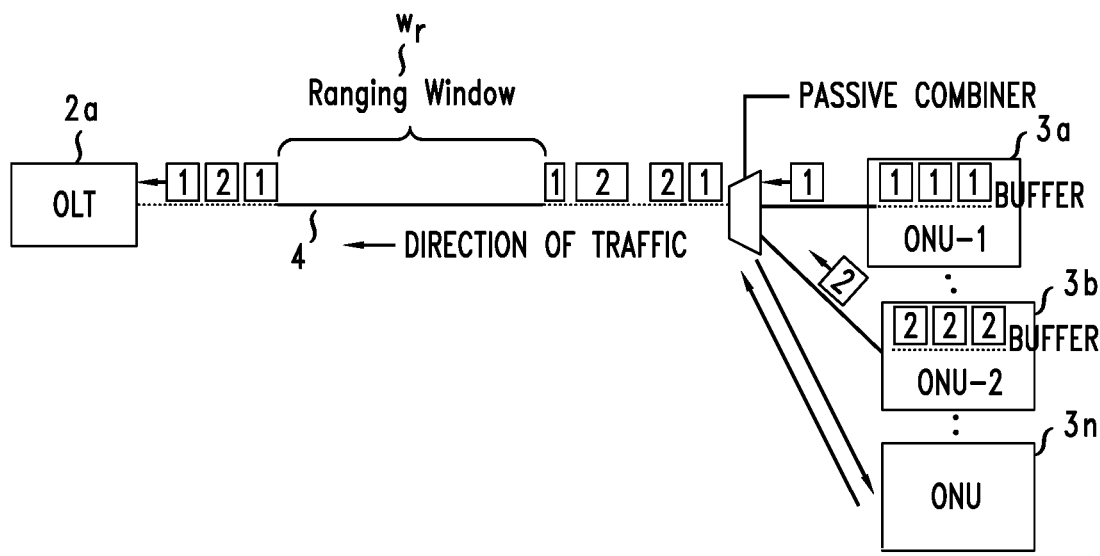
FIG. 2 illustrates the use of a traffic window in a simplified PON network.

Exemplary embodiments of systems, devices and related methods for reducing delays in a PON and other networks are described herein and are shown by way of example in the drawings. Throughout the following description and drawings, like reference numbers/characters refer to like elements.

It should be understood that, although specific embodiments are discussed herein, the scope of the disclosure is not limited to such embodiments. To the contrary, it should be understood that the embodiments discussed herein are for illustrative purposes, and that modified and alternative embodiments that otherwise fall within the scope of the disclosure are contemplated.

It should also be noted that one or more exemplary embodiments may be described as a process or method (the words "method" or "methodology" may be used interchangeably with the word "process" herein). Although a process/method may be described as sequential, it should be understood that such a process/method may be performed in parallel, concurrently or simultaneously. In addition, the order of each step within a process/method may be rearranged. A process/method may be terminated when completed, and may also include additional steps not included in a description of the process/method if, for example, such steps are known by those skilled in the art.

As used herein, the term "and/or" includes any and all combinations of one or more of the associated listed items. As used herein, the singular forms "a," "an" and "the" are intended to include the plural form, unless the context and/or common sense indicates otherwise.

It should be understood that when a system or device or a component or element of a system or device is referred to, or shown in a figure, as being "connected" to (or other tenses of connected) another system, device (or component or element of a system or device) such systems, devices, components or elements may be directly connected, or may use intervening components or elements to aid a connection. In the latter case, if the intervening systems, devices, components or elements are well known to those in the art they may not be described herein or shown in the accompanying figures.

As used herein the term "operable to" means "functions to" unless the context, common sense or knowledge of one skilled in the art indicates otherwise.

Unless otherwise noted herein, or as otherwise understood by those skilled in the art based on the context herein, it should be understood that when used herein the phrases "ultra-low latency traffic" and its abbreviation "ULL traffic" includes data and signaling that is subject to both service level and transport level latencies (i.e., delays). It should be further understood that ULL traffic includes ultra-reliable low latency traffic involved in ultra-reliable low latency communication (URLLC), 5G services where one-way transport latencies may be ≤100 µs, for example.

It should be understood that the inventive ONUs or OLTs described herein may include one or more electronic processors that are operable to retrieve and execute instructions stored as electronic signals in electronic memory, where a set of such stored instructions may constitute steps in an inventive process (e.g., a "learning process") or application, or may be used to complete an inventive function such as allocating, analyzing, determining, estimating, receiving, transmitting, generating, mapping, prohibiting, scheduling, initiating, computing and storing to name just a few inventive functions that may be completed by executing such stored electronic instructions. Further, it should be understood that each of the embodiments of the ONUs, OLTs and other associated devices described herein are configured with the necessary hardware components to enable each to process signals and content (e.g., traffic) much faster than humanly possible and to exchange signaling and content much faster than humanly possible. Each of the embodiments of the present invention cannot practically be implemented in any amount of time that would be acceptable to one skilled in the art using human beings as substitutes for the systems and devices described herein. For example, the embodiments described herein involve methods that avoid or reduce delays in a PON network. Accordingly, the use of humans as substitutes for such methodologies is contrary to the objectives of the invention and does not result in the improvements provided by the invention because the inventive methodologies process signals and content (traffic) many times faster than the human mind (within the time periods demanded by users of embodiments of the present invention and those skilled in the art of the present invention).

One such processor or processors may be referred to herein as an "engine" operable to retrieve and execute instructions stored as electronic signals in electronic memory, where a set of such stored instructions may constitute steps in an inventive process or application, or used to complete an inventive function, such as dynamic bandwidth allocation ("DBA", relatedly, DBA engine).

As used herein, the term "embodiment" means an example that falls within the scope of the invention(s).

The inventors discovered that "ranging-induced" latencies that result from existing in-band techniques may be avoided or substantially reduced by inventive devices (e.g., OLTs) that are operable to dynamically initiate in-band traffic windows during periods of time that do not correspond with the transmission of ULL traffic from ONUs.

The inventors recognized that in many (most) instances an OLT has little or no control over the timing of transmissions of ULL traffic from an ONU. Nonetheless, the inventors discovered that traffic windows may be initiated "opportunistically"—where an OLT (or another associated or centralized device) functions to identify and intelligently schedule in-band traffic windows to be initiated during times and time periods that do not correspond to the time periods of transmissions from ONUs that contain ULL traffic. This provides a substantial improvement over existing in-band ranging window techniques which schedule and initiate ranging windows regardless of whether or not an ONU is transmitting ULL traffic. Further, the inventive in-band traffic window methods do not require the PON to be out-of-service in order to schedule traffic windows related to a new ONU that is joining the PON. Still further, the inventive in-band traffic window methods do not require knowledge of a PON's infrastructure to schedule in-band traffic windows of reduced length compared to an existing process when traffic, other than ULL traffic, is involved.

Yet further, the inventive devices (e.g., an OLT or another associated or centralized device) may execute instructions stored in memory to complete a "learning" process to estimate an optimum time and time period to implement a traffic window (e.g., ranging window or "quiet" window) based on historical and real-time information related to the traffic patterns of a given PON.

In one embodiment, an exemplary device (e.g., OLT) may be operable to receive information about the timing and capacity of ULL traffic transmissions from ONUs within a PON. Upon receiving such information an inventive OLT may be operable to determine when transmissions containing ULL traffic from ONUs may occur (i.e., are scheduled to occur). Thereafter, the inventive OLT may be further operable to identify in-band traffic window time periods (hereafter "traffic windows" or "window" for short) and generate a schedule of such time periods, where the schedule may comprise the times and/or time periods during which a traffic window may be initiated. For example, each time and/or time period within such a schedule corresponds to a time period during which at least the exchange of at least one grant and acknowledgement may occur without substantially, adversely affecting the transmission of ULL traffic.

It should be further understood that the information received by the OLT may include an indication of which ONUs within a PON will be transmitting ULL traffic (i.e., are scheduled to transmit) as well as the timing of such transmissions. Further, such information may indicate that some or all of the ONUs will transmit ULL traffic.

In accordance with embodiments of the invention, an inventive OLT (or another associated or centralized device)

may receive information about the timing of ULL traffic transmissions from ONUs within a PON in a number of different ways.

In one embodiment, in a PON that makes use of distributed processing, information related to the timing and capacity (amount) of ULL traffic transmissions may be received by either a central unit (CU) (not shown in figures) that processes non real-time data (for non-real time services) or a distributed unit (DU) that processes real-time data (for real-time services), among other things (e.g., DU 5 in FIG. 1) in accordance with the Cooperative DBA ("dynamic bandwidth allocation") protocol (undergoing standardization in ITU-T) or the new Cooperative Transport Interface (CTI) (undergoing standardization in ITU-T and ORAN). For ease of understanding only DU 5 is depicted in FIG. 1 though it should be understood that the inventive functions described herein may be completed by a CU. Further, it should be understood that in many instances both a CU and DU are present within PON 1, connected by a so called F1 or Fx interface known in the art. In embodiments of the invention, in addition to completing the inventive functions and features described herein, the combination of a CU/DU may also be operable to complete the additional functions of an eNodeB.

In more detail, in one embodiment an OLT (e.g., OLTs 2a to 2n in FIG. 1) that is part of a PON that is connected to a 5G wireless/radio network via a DU (e.g., DU 5 in FIG. 1) or a CU, for example, utilizing frequency division duplex (FDD) multiplexing for transmissions from the OLT to an ONU (e.g., ONU 3n in FIG. 1) may be operable to receive, from DU 5 (or a CU or base station), timing information that identifies those time slots during which traffic windows may be scheduled. Thereafter, the OLT may be operable to generate a schedule of traffic windows based on the received timing information by, for example, assigning a traffic window to each "empty" (i.e., unused) slot within a transmission to an ONU. Alternatively, an OLT (e.g., OLTs 2a to 2n in FIG. 1) that is part of PON that is connected to a 5G wireless/radio network via DU 5 (or a CU or base station) utilizing time division duplexed transmissions may be operable to receive, from a DU 5 (or a CU or base station) information that identifies the time slots during which traffic windows may be scheduled from the DU (or CU or base station, i.e., the timing information is not sent, just the identity of the slots). Thereafter, the OLT 2a to 2n may be operable to generate a schedule of traffic windows based on the received time slots by assigning a ranging window to each slot.

Alternatively, the OLT may send an indication or request to the DU 5 (or CU, base station) informing (or requesting) the DU 5 (or CU or base station) that the OLT 2a to 2n (or another centralized network device within the PON) will be controlling the identification, scheduling and initiation of opportunistic traffic windows and related operations regardless of whether information is received from the DU (or CU or base station, for example). In response, an inventive DU 5 (or CU or base station) may be operable to receive such an indication or request and accommodate such an indication or request in its allocation of grants to user equipment (UE).

Accordingly, the OLT may be operable to identify and generate a schedule of in-band traffic windows without receiving information from a DU (or from a CU or base station) or another external device. For example, an inventive OLT may be operable to execute one or more instructions (e.g., learning processes) stored in its memory or otherwise stored in one or more devices the OLT can be connected to or can gain access to in order to identify traffic windows and generate such a schedule. In one embodiment, as part of an exemplary process the OLT may function to use stored, historical traffic profiles of transmissions from the ONUs within a given PON and their associated latency demands for services/patterns (e.g., ULL requirements). Based on such information, as well as real-time information, an inventive OLT may be operable to identify traffic windows and generate a schedule of the timing of the initiation of traffic windows that avoids or reduces unwanted delays by initiating the traffic windows at times that do not correspond to the transmission of ULL traffic.

In more detail, an exemplary learning process may include the following. Initially, OLT 2a to 2n (or another centralized network device) may be operable to generate a mapping of bandwidth requirements based on historical and/or real-time traffic profiles (e.g., radio access network (RAN) requests, ONU-buffer read-outs, and/or Cooperative Transport Interface ("CTI")-interface information or Co-DBA information to name just a few sources that may be utilized) to generate such a mapping ("maps" for short). The exemplary maps may be stored for further processing and use by the OLT 2a to 2n.

In addition, information regarding the frames and sub-frames used for uplink-downlink slot allocation may be provided to the OLT 2a to 2n by a DU or CU, for example. In one embodiment, slot allocations for a TDD wireless transmission system may be provided to the OLT 2a to 2n (or another associated device) whereupon the OLT 2a to 2n may be further operable to determine which empty slots may be suitable for use as a traffic window.

That is to say, OLT 2a to 2n (or another device separate from an OLT (e.g., a central controller) may be operable to analyse the stored bandwidth maps and frame/subframe allocations to identify one or more patterns associated with re-occurring, unused or unallocated frames or subframes (e.g., a series of 5 to 10 adjacent unused frames of TDD transmissions) making up ONU to OLT transmissions. In an embodiment, once a pattern is identified OLT 2a to 2n may be further operable to select one or more frames or sub-frames that comprise an identified series for further analysis as to whether or not a frame or subframe may be used as a part of a traffic window. For example, OLT 2a to 2n (or an associated unit) may be operable to select a given frame(s) or subframe(s) within the identified pattern/series based on the probability that the frame(s) or subframe(s) may be unused/unallocated. The OLT 2a to 2n may assign a probability value to each analysed frame(s) or subframe(s) where the value indicates the likelihood that given frame(s) or subframe(s) within the identified pattern/series will be unused or unallocated in the future and store such values in memory. Thereafter, the OLT 2a to 2n (or an associated unit) may be operable to select the given frame(s) or subframe(s) for use as a part of a traffic window based on the stored probability values.

Once the inventive traffic windows have been identified and/or a schedule of such windows has been generated, the ONUs 3a to n, for example, may be operable to transmit ULL traffic to an OLT 2a to 2n, for example, during a traffic window that has been scheduled to correspond to a time period that does not substantially, adversely affect the transmission of the ULL traffic, where (as described herein) the traffic window may comprises one or more frames or sub-frames associated with stored values for each frame and subframe, and where the values indicate the probability that such frames or subframes may be re-occurring and unused or unallocated.

In an embodiment, a selected frame or subframe may represent an optimum time to implement a traffic window (ranging window or quiet window). Further, once the optimum times to implement traffic windows have been identified, the OLT 2a to 2n may be further operable to generate and store a schedule of such windows.

In another exemplary method, OLT 2a to 2n (or an associated unit) may be operable to generate a signal that functions as a "trigger" to initiate a traffic window in conjunction with a DBA engine, for example. In more detail, referring back to FIG. 1 the OLT 2a to 2n may send a generated trigger to a DBA engine 6 that may be a part of, or associated with, DU 5 for example (e.g., DU 5 comprises a DBA engine 6). Upon receiving the trigger the DBA engine 6 may be operable to control the flow of traffic to OLT 2a to 2n in order to implement a traffic window by prohibiting the transmission of data from an ONU, for example, thereby creating a time period during which a "grant" and "acknowledgment" may be sent/received. In an embodiment, the length of an exemplary traffic window may comprise a number of unused frames or subframes that are subsequent to the trigger signal, for example.

In an embodiment, the receipt of the trigger signal and initiation (i.e., generation) of the traffic window may occur substantially sequentially in real-time, or alternatively, may occur separated in time. For example, a DBA engine 6 may generate a schedule of traffic windows sometime after the receipt of a trigger signal.

In an embodiment, the trigger signal may include additional information, such as an indication of the length of a potential traffic window. For example, in an embodiment if an OLT 2a to 2n has previously determined that there is a probability that there are 5 unused frames (or subframes) following the initiation of a window at a given time, then an exemplary trigger signal may comprise information indicating that a window may be as long as 5 frames. Accordingly, an exemplary DBA engine 6 may be operable to effectively generate a window having a length of time substantially equal to 5 frames by prohibiting traffic from ONUs during such time period. Alternatively, the information related to the length of a window may be sent in a second signal from an OLT 2a to 2n to the DBA engine 6 instead of being made a part of a trigger signal.

Yet further, the functionality of the DBA engine 6 may be incorporated into an OLT 2a to 2n. In such a scenario, the OLT 2a to 2n may generate a window without sending a trigger signal or other information to a separate DBA engine.

In sum, the inventive OLTs (or other centralized devices within the PON) may be operable to identify, schedule and initiate traffic windows such that the resulting windows do not adversely affect upstream ULL traffic.

In one embodiment, an exemplary schedule of windows may include start times for the initiation of one or more windows, where each start time corresponds to a time and time period (e.g., slot) that is large enough to accommodate a window (e.g., a grant/acknowledgment) but where, again, the window does not adversely affect upstream ULL traffic.

The inventors further recognized that, in some instances, a long period of time might elapse before a large enough time period between transmission of ULL traffic is predicted to occur to accommodate a window. Accordingly, in another embodiment, an inventive OLT (or, alternatively a base station, CU or DU, for example) may be operable to set a threshold time limit value. Further, such a device may be operable to determine (using stored instructions in memory, for example) whether a time period that exceeds the threshold value has elapsed since the initiation of the last window, for example. In one embodiment, if such a threshold has been exceeded, the OLT may be operable to interrupt an ULL transmission(s) and initiate a window. If such interruptions occur at a low enough frequency, unwanted delays (among other things) to ULL traffic transmissions may be minimized.

It should be understood that the foregoing description only describes a few of the many possible embodiments that fall within the scope of the inventions. For example, other networks besides a PON may make use of the inventive features and methods described herein. Numerous changes and modifications to the embodiments disclosed herein may be made without departing from the general spirit of the invention, the scope of which is best defined by the claims that follow.

We claim:

1. A system for identifying traffic-free, in-band time period windows ("traffic windows") comprising:
   a device operable to,
   identify one or more patterns of re-occurring and unused or unallocated frames or subframes; and
   select one or more frames or subframes within an identified pattern based on stored values for each frame and subframe, the values indicative of the probability that the selected frames or subframes may be re-occurring and unused or unallocated, for use as a part of one of the traffic windows based on the stored probability values.

2. The system as in claim 1, wherein the device is further operable to analyze stored bandwidth maps or frame or subframe allocations and identify the one or more patterns of re-occurring and unused or unallocated frames or subframes based on the analysis of the maps or allocations.

3. The system as in claim 1 where the device is further operable to generate a schedule of traffic windows, wherein each window is scheduled to correspond to a time period that does not substantially, adversely affect ULL traffic transmissions.

4. The system as in claim 1 wherein the device comprises an optical line terminal.

5. The system as in claim 2 wherein the device is further operable to receive the frame and subframe allocations from a base station, central unit (CU) or distributed unit (DU).

6. The system as in claim 5 wherein the device is further operable to receive the frame and subframe allocations from the base station, CU or DU in accordance with a Cooperative DBA or CTI protocol.

7. The system as in claim 5 wherein the device is further operable to send an indication to the base station, CU or DU to inform the base station, CU or DU that the device will control scheduling of traffic windows.

8. The system as in claim 1 further comprising a base station CU or DU operable to receive an indication that the device will control scheduling of traffic windows.

9. The system as in claim 3 wherein the schedule further comprises start times for initiation of one or more of the in-band traffic-free time period windows.

10. The system as in claim 1 wherein the device is further operable to set a threshold time limit value, and determine whether or not a time period since the initiation of a last in-band, traffic-free time period window exceeds the threshold value.

11. The system as in claim 10 wherein the device is further operable interrupt ULL traffic transmissions and initiate an in-band, traffic-free time period window if the threshold time limit value has been exceeded.

12. A method for identifying traffic-free, in-band time period windows ("traffic windows") comprising:
- identifying one or more patterns of re-occurring and unused or unallocated frames or subframes; and
- selecting one or more frames or subframes within an identified pattern based on stored values for each frame and subframe, the values indicative of the probability that the selected frames or subframes may be re-occurring and unused or unallocated, for use as a part of one of the traffic windows based on the stored probability values.

13. The method as in claim 12 further comprising analyzing stored bandwidth maps or frame or subframe allocations and identifying the one or more patterns of re-occurring and unused or unallocated frames or subframes based on the analysis of the maps or allocations.

14. The method as in claim 12 further comprising generating a schedule of traffic windows, wherein each window is scheduled to correspond to a time period that does not substantially, adversely affect ultra-low latency traffic transmissions.

15. The method as in claim 13 further comprising receiving the frame and subframe allocations from a base station, central unit (CU) or distributed unit (DU).

16. The method as in claim 15 further comprising receiving the frame and subframe allocations from the base station, CU or DU in accordance with a Cooperative DBA or CTI protocol.

17. The method as in claim 15 further comprising sending an indication to the base station, CU or DU to inform the base station, CU or DU that the base station, CU or DU does not have to control scheduling of traffic windows.

18. The method as in claim 12 further comprising receiving at a base station CU or DU an indication that the base station, CU or DU does not have to control scheduling of windows.

19. The method as in claim 14 wherein the schedule further comprises start times for initiation of one or more of the traffic windows.

20. The method as in claim 12 further comprising setting a threshold time limit value, and determining whether or not a time period since the initiation of a last traffic window exceeds the threshold value.

21. The method as in claim 20 further comprising interrupting ULL traffic transmissions and initiating a traffic window if the threshold time limit value has been exceeded.

* * * * *